United States Patent [19]
Eberle

[11] 3,753,783
[45] Aug. 21, 1973

[54] BATTERY, COMPONENTS, AND METHOD OF MAKING

[75] Inventor: William J. Eberle, Reading, Pa.

[73] Assignee: General Battery Corporation, Reading, Pa.

[22] Filed: Nov. 24, 1971

[21] Appl. No.: 201,818

[52] U.S. Cl.............. 136/134 R, 136/168, 136/176
[51] Int. Cl...................... H01m 5/00, H01m 35/32
[58] Field of Search.................... 136/80, 81, 134 R, 136/166, 168, 170, 176

[56] References Cited
UNITED STATES PATENTS

| | | | |
|---|---|---|---|
| 2,480,964 | 9/1949 | Randall | 136/134 R |
| 1,958,186 | 5/1934 | Dietrich | 136/134 R |
| 3,396,056 | 8/1968 | Gonnard | 136/134 R |

FOREIGN PATENTS OR APPLICATIONS

| | | | |
|---|---|---|---|
| 1,073,377 | 6/1967 | Great Britain | 136/134 R |

*Primary Examiner*—Donald L. Walton
*Attorney*—Henry N. Paul, Jr., John F. McNulty et al.

[57] ABSTRACT

A battery is provided, generally of the lead acid storage battery type, having spaced plates therein, with selected plates connected together in electrically conductive fashion, and with plates on opposite sides of cell partitions being connected, wherein particularly novel types and placements of such connections facilitate low resistance in connections between plates and preferably facilitate inclusion of greater quantities of acid within a battery, by effecting such connections externally of the battery casing.

14 Claims, 16 Drawing Figures

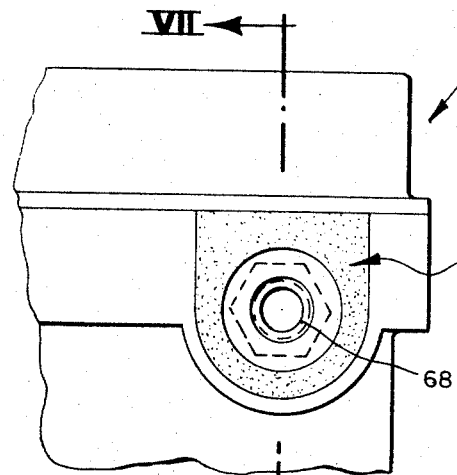
Fig. 6
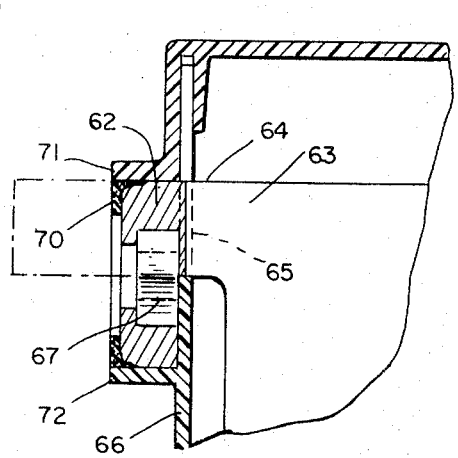
Fig. 7
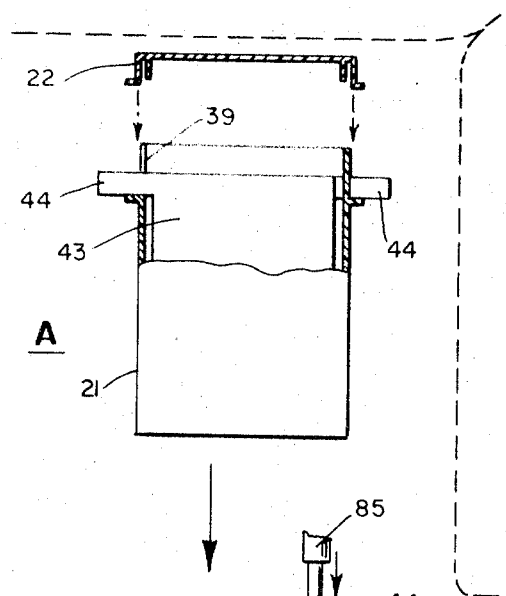
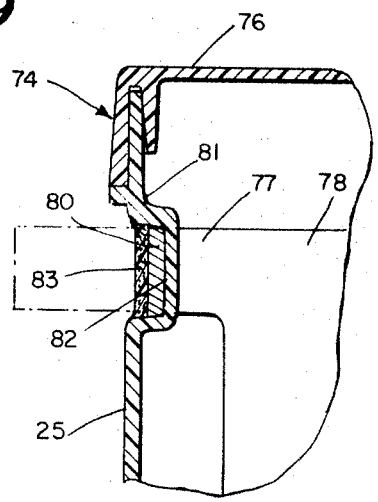
Fig. 8
Fig. 9
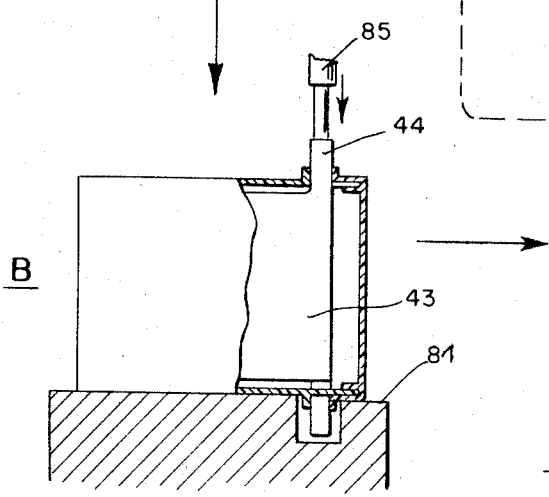
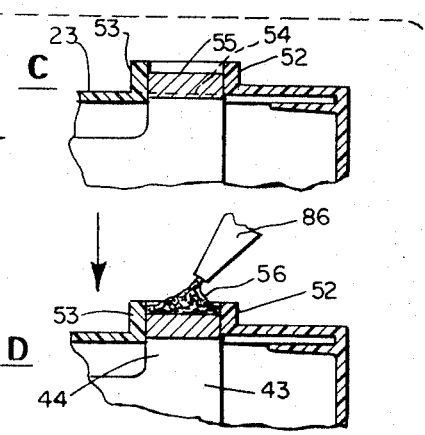

BATTERY, COMPONENTS, AND METHOD OF MAKING

BACKGROUND OF THE INVENTION

In lead acid storage batteries of prior art types, most particularly those adapted for use with automobiles or the like, it has become commonplace to utilize multiple cells in a single battery casing, such as six cells, with the cells being separated by partitions, and with each cell containing an amount of electrolyte therein, separately held with respect to electrolyte in other cells. Also, within the cells there are provided battery plates spaced by suitable separators, with the acid facilitating electron flow between opposing plates. Generally, at the upper ends of the plates, upstanding lugs are provided, along each sidewall of the battery casing, but inside of such casing. These lugs generally extend above the electrolyte levels within the battery cells, and are conventionally connected by a suitable strap that traverses selected (generally every other one) plates on each side of the casing within each cell, such that alternate plates are connected along opposite sides of a given cell, and with these straps of selected adjacent ones of the cells on a given side of the battery being connected, either integrally, or by weldments, to upstanding posts, that are disposed on opposite sides of a partition, and connected across the top of the partition. Thus, for example, in a battery having six cells, there would be five partitions separating the cells, and, on one side of the battery, the first and second cells may be connected in a manner aforesaid, and on the other side of the battery, the second and third cells may be connected, and again on the first side the third and fourth cells may be connected, all in a conventional manner. At the ends of the battery, terminals are provided, connected to suitable straps in end cells.

Batteries constructed in accordance with prior art techniques having a construction similar to that discussed above, while often functioning satisfactorily, also often do not function satisfactorily, and are furthermore subject to certain inherent problems. For example, such connections between adjacent cells, whereby straps are utilized, and post extensions of the straps are connected up over intermediate partitions, require substantially large quantities of lead, or other suitable conductor metal. Also the electrical conductivity of such connectors presents certain disadvantages, in that the long path between groups of plates lends itself towards providing increased resistance to the flow of electrical current, and also presents greater opportunity for electrical breaks in the conductors, in addition to consuming large quantities of lead. Even further, such connections cannot readily be checked visually for electrical conductivity after the cover is placed over the battery casing. A further disadvantage is provided, in that these electrical connections between plates are present in an atmosphere above the electrolyte, which is generally a hydrogen atmosphere, and that shorts or the like can melt the electrical connections, and in some instances can cause explosion due to the presence of the hydrogen atmosphere.

Even further, because of the necessity to provide, within the battery casing, a substantial zone for accommodating these electrical connections across partitions, it has been the practice to starve the batteries for electrolyte, or to provide a less than completely adequate quantity of electrolyte within a cell, in order to allow sufficient space above the liquid electrolyte for gassing and condensing, as well as for expansion of the liquid electrolyte. Also, the posts, straps and connectors require space, that could otherwise accommodate electrolyte if such are submerged, or that could otherwise provide space for gassing, expansion or the like, if such components are not submerged. Thus the space utilized by such components could better be utilized by the acid, or provide headspace thereabove. Even further, these prior art types of connections between battery cells, and of plates within a battery cell lend themselves toward corrosion of connections within the atmosphere above the electrolyte, due to the acid vapor nature of such atmosphere.

The art has developed to remove some of the above-mentioned prior art objections, in providing a connection between straps of adjacent cells that extends through the partition wall that separates cells. Such a modification has facilitated the shortening of the electrically conductive path between cells, and has thereby often yielded better electrically conductive features for the battery, in addition to using less lead, but has presented other problems such as the difficulty of facilitating a visual inspection for electrical continuity of the connection between opposite sides of the partition through which the connection is effected. Also, this latter-mentioned development has fairly limited the height of electrolyte that may be provided within the cells, in addition to presenting a sealing problem of its own, such sealing being necessary in order to prevent the transfer of electrolyte between adjacent cells, through the partition walls.

Furthermore, other problems have not been eliminated by this latter development, such as the corrosion of connections in the environment above the electrolyte level, and the potential melting of connections, or explosion caused by electrical shorts in the atmosphere above the electrolyte level within the battery.

THE PRESENT INVENTION

The present invention seeks to obviate the above and other difficulties of prior art techniques of battery manufacture, and of batteries manufactured by such techniques, in providing a battery having connections between plates of the same cell, and between plates in adjacent cells on opposite sides of partitions that are outside the environment above the electrolyte, and that are outside the battery itself, such connections being made externally of the battery casing, by extending lugs of battery cell plates through voids in the casing sidewalls, and effecting electrically conductive connections externally of the casing, generally by welding of the same, and then coating the weldments thus effected with an electrically non-conductive material. The lugs that protrude externally of the casing may extend through slotted holes or the like, in close fitting relation to portions of the sidewall through which they extend, and a sealing may be effected in the welding operation, and whereby the sealing may further be effected by the application of a resin or the like non-conductive coating. This technique of battery manufacture would require less lead in the making of connections, in that straps between alternate plates within a cell would not be utilized in all of the cells, nor would the upstanding post lugs be utilized to traverse partitions, but only lugs of the battery cell plates themselves, with a connection being provided by the weldment extending between the same externally of the casing sidewalls. The present invention would also permit a visual external inspection or check of the weld continuity, and inasmuch as the path of connection between plates of a given cell would be short, as well as the path of connection between plates of different cells being also short, such connections would be better from an electrical standpoint, in offering less resistance, and thereby facilitating a maximizing of voltage between terminals at opposite ends of the battery. Even further, the present invention, by placing connections outside the hydrogen atmosphere within the battery, and outside any acid vapor, removes the danger of explosion, or the like, and also minimizes or removes the chance of corrosion occuring at the connections, in that the connections are externally of the battery casing, and, for all practical purposes, not exposed to the acid vapor environment of the upper end of the battery casing, above the electrolyte level.

Even further, the present invention, by placing the connections externally of the battery, thereby leaves more room for electrolyte within the battery, and removes a restriction that may have otherwise required the battery to be starved for electrolyte. Thus, the battery can operate more efficiently from an electrical standpoint. Also, with the present invention, inasmuch as no breach of the partition wall between adjacent cells is effected, there is no tendency for transfer of an electrolyte across the partition. The external nature of the welds also renders them accessible for subsequent sealing purposes as aforesaid. Also, by the use of slotted holes or voids in the battery casing sidewalls, the positioning and placement of cell plates, as well as plate separators, is more easily effected by loading stacked elements immediately into the casing, and seating them well. The weldments may be effected when the plates or elements are in a relaxed state, thereby eliminating potential misalignment and pre-stressing problems that may otherwise be created by forced alignment, in accordance with battery cell strap weldments of prior art types. Furthermore, less handling of the plates and weldments for connecting plates within cells is required by virtue of the present invention, and therefore, this invention provides a potential for fewer rejects during battery construction. Furthermore, because the connections between plates are shorter, and especially because the connections between plates of adjacent cells are shorter, batteries constructed in accordance with the present invention lend themselves toward substantially vibration-free operation. Furthermore, construction efficiencies may be effected, in accordance with the present invention, in that while prior art techniques required a separate welding operation for connecting plates within a given cell, and a subsequent welding operation for connecting posts across the upper end of partitions, the present invention effects the welding of plates of a given cell concurrently with the welding of plates of adjacent cells, and thereby achieves manufacturing economy.

Furthermore, in accordance with prior art techniques, it was possible for assembly workers to drop plates into a cell backwards, which would result in a reverse cell within the battery, such reverse cell having the capability for reducing the positive plates, and converting the negative plates to lead peroxide, when subjected to the working acid, the reverse of the intended function of such plates.

In accordance with at least one embodiment of the present invention, wherein the cases are pre-slotted to receive a given number of positive plates, and a like number plus one of negative plates, it would be impossible for one to inadvertently place a negative group into positive cell slots, without having one plate left over, with no slots to accommodate it. It would thus be practically impossible to effect such an accidental backwards placement of plates within a cell, in accordance with certain embodiments of the present invention.

Also, it will be noted that the placement of electrical connections in accordance with the present invention permits complete immersion of plates in acid, without danger of acid corrosion of the electrical connections, inasmuch as the electrical connections are positioned externally of the battery casing.

SUMMARY OF THE INVENTION

The present invention is directed toward providing a multiple cell battery utilizing plates in each cell, with the connections of plates in a given cell, and with the connections of plates in adjacent cells, taking place externally of the battery casing in most instances, and preferably, where possible, in all instances.

Accordingly, it is a primary object of this invention to provide a novel battery.

It is a further object of this invention to provide a novel method of making a battery.

It is a further object of this invention to provide a novel battery utilizing connections between plates of adjacent cells, wherein such connections are disposed externally of the battery casing.

It is a further object of this invention to provide a battery in accordance with the object set forth immediately above, wherein connections between plates of the same cell are also effected externally of the casing.

It is another object of this invention to accomplish both objects set forth immediately above, wherein such connections are effected, by a common weldment, at least with respect to a series of two adjacent cells, and with respect to selected plates of each of those cells.

It is a further object of this invention to provide the methods for accomplishing the objects set forth above.

Other objects and advantages of the present invention will become more readily apparent to those skilled in the art from a reading of the following brief descriptions of the drawing figures, details of descriptions of the preferred embodiments, and the appended claims.

IN THE DRAWINGS

FIG. 1 is a top perspective view, partially exploded and partially broken away for the sake of clarity, whereby plates of several cells of a battery are illustrated in position for disposition within cells thereof, and with respect to some of the cells, the plates are illustrated within such cells, and with lugs of the plates protruding through slots of the battery sidewalls. This illustration is of an embodiment of the invention having upper terminals, extending through the battery cover.

FIG. 6 is a fragmentary illustration of an alternative embodiment of this invention, utilizing a battery terminal in the sidewall of the battery.

FIG. 7 is a fragmentary transverse sectional view, taken generally along the line VII—VII of FIG. 6, and illustrating the details of the terminal construction thereof.

FIG. 8 is a fragmentary transverse sectional view of a modified form of a battery casing and weldment configuration, in accordance with this invention.

FIG. 9 is a composite view, utilizing illustrations 9A, 9B, 9C and 9D, to illustrate various sequential steps in the formation of a battery, in accordance with this invention.

Figure 1:
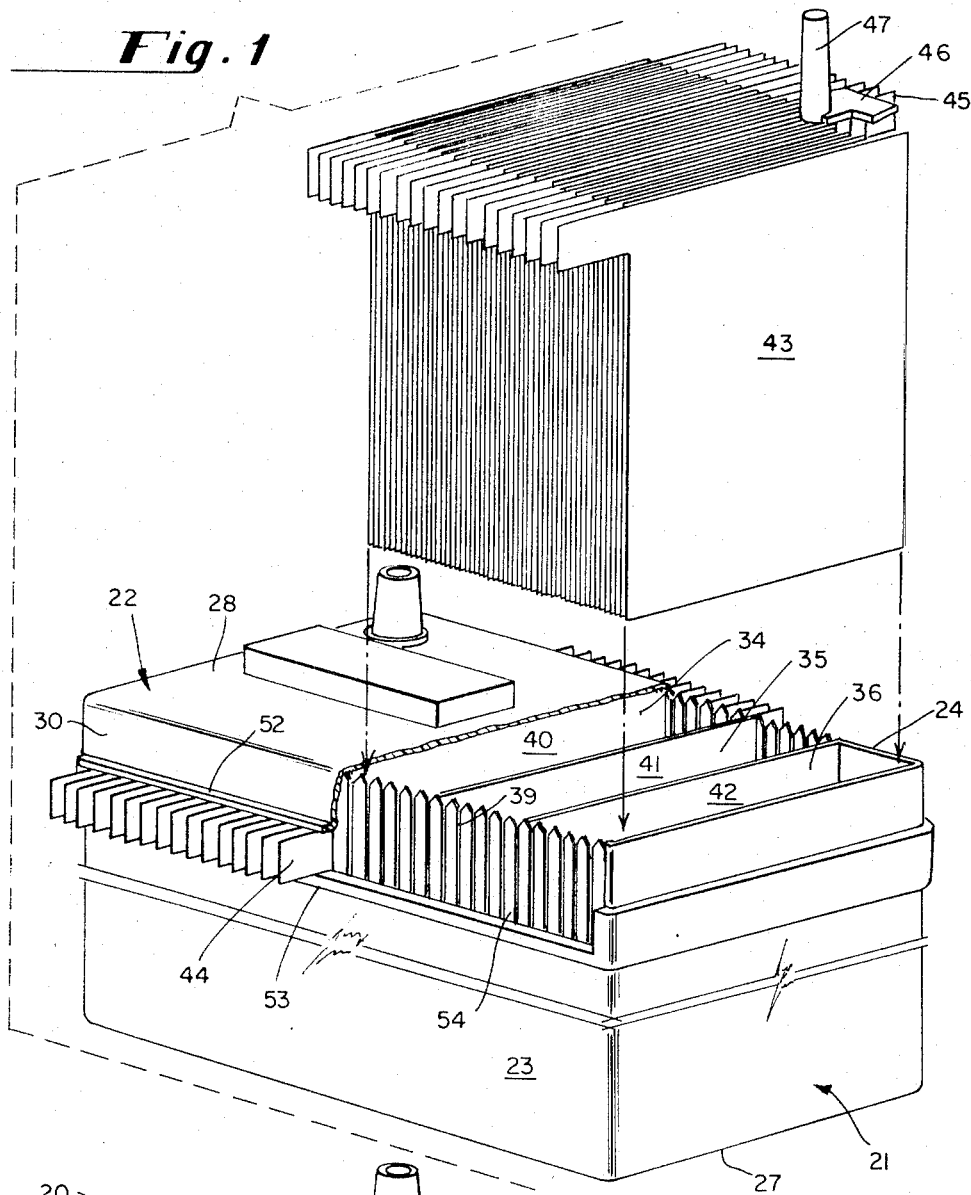
Figure 2:
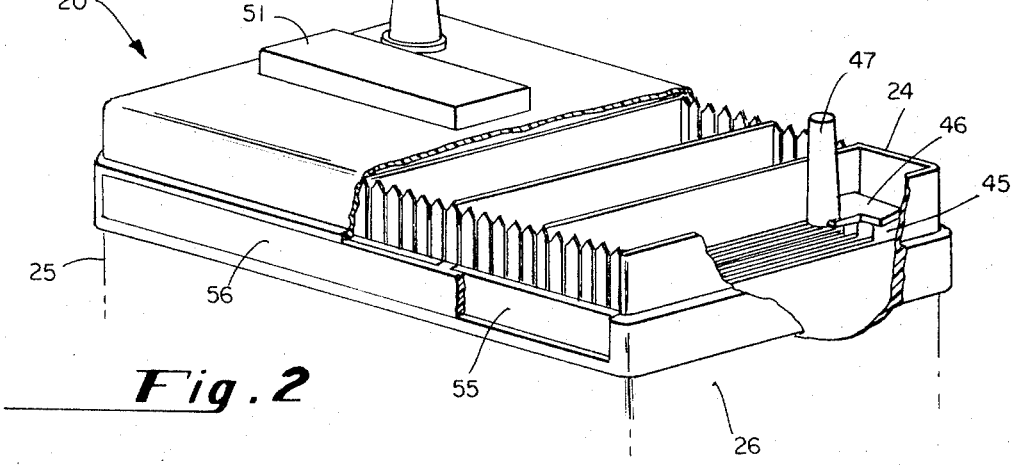
FIG. 2 is a fragmentary illustration of the battery of FIG. 1, with all plates assembled, but with a portion of the cover at one end, as well as a portion of one of the sidewall weldments being illustrated broken away, also for the sake of clarity.

Referring now to the drawings in detail, reference is first made to FIGS. 1 and 2, wherein a battery generally designated by the numeral 20 is illustrated, as including a casing 21 having a cover 22 fitted over an open upper end thereof.

The casing 21 has sidewalls 23 and 24, and end walls 25 and 26, and a bottom wall 27. The cover 22 includes an upper wall 28 and a peripheral edge 30 disposed thereabout, as illustrated in FIG. 1, with portions substantially in vertical alignment with sidewalls 23 and 24, and end walls 25 and 26 of the casing 21.

Figure 4:
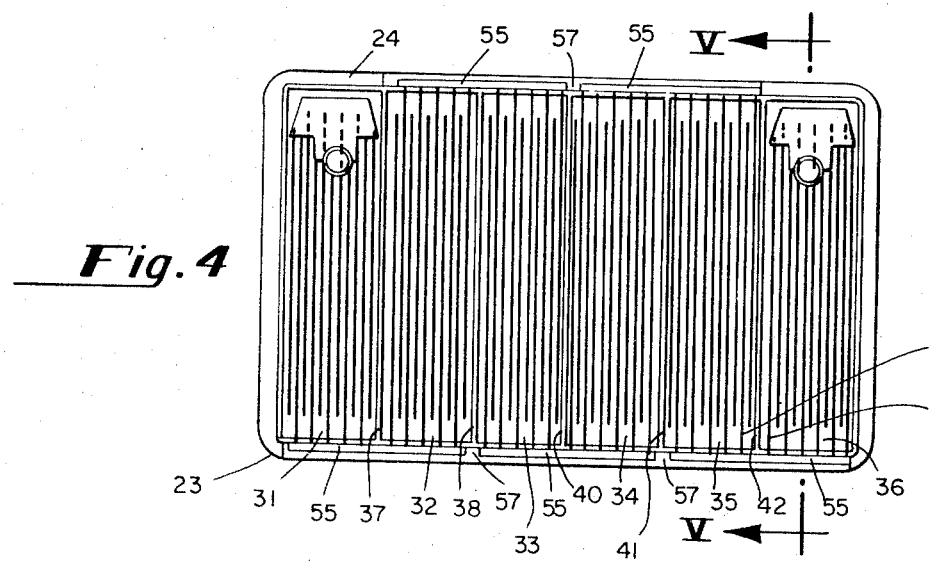
FIG. 4 is a view similar to that of FIG. 3, with the battery cover being completely removed, and subsequent to the welding of the external connections in accordance with this invention.

A plurality of cells, 31, 32, 33, 34, 35 and 36, as are most clearly illustrated in FIG. 4, are provided within the casing 21, with partitions 37, 38, 40, 41 and 42, separating them, with the partitions extending between sidewalls 23 and 24 thereof. The partitions are adapted for maintaining the cells in liquid-tight relation with respect to each other.

Figure 3:
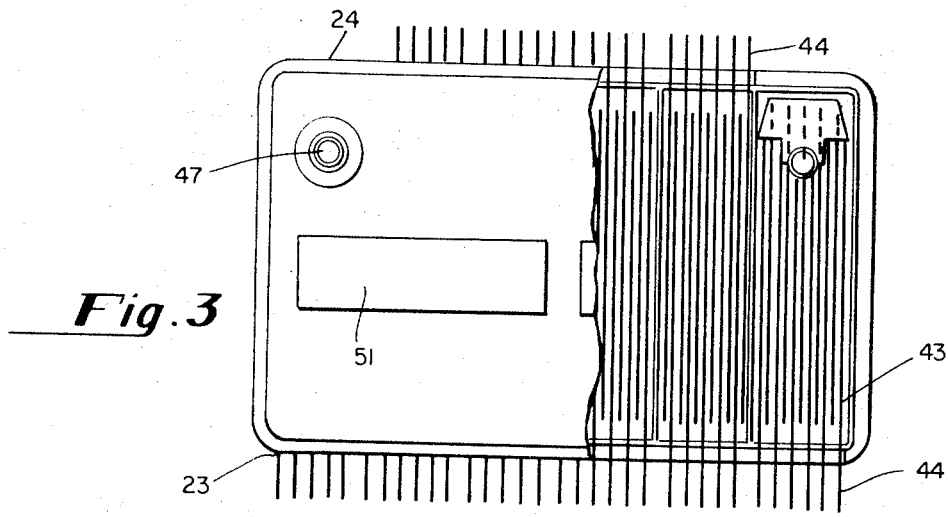
FIG. 3 is a top plan view of the battery of FIG. 1, with portions of the cover being broken away for the sake of clarity.

A plurality of plates 43 are provided, in each of the cells, with the plates 43 each having integral lugs 44, and with alternate ones of the plates 43 having lugs 44 extending through slots 39 in the sidewalls 23 and 24, as is illustrated most clearly in FIGS. 1 and 3.

In the embodiment of FIGS. 1–5, those plates in cell 36, and those plates in cell 31, that are disposed between plates that have lug extensions that extend through slots 39 in sidewall 23, are connected by a weldment between upstanding lugs 45 that are connected by a suitable welding process or the like to a strap 46, and with the strap 46 being connected to an upstanding terminal post 47. It will thus be apparent that those plates that have upstanding lugs 45 do not have outwardly directed lugs 44, extending through slots of the sidewall 24, and in this respect, those plates that are connected to straps 46 differ from their counterparts in the cells 32, 33, 34 and 35. Of course, there are no slots 39 at ends of the cells 31 and 36 that are adjacent the sidewall 24, in that there are no outwardly extending lugs 44 for passing through the sidewall 24 at such location.

Those slots 39 that receive outwardly extending plate lugs 44 are sized, to be in close-fitting relation with the sides of the lugs 44.

Posts 47 are received within a metal member 48, in slip-fitting electrically connecting relation therewith, with the member 48 being threaded into a threaded portion 50 of the plastic cover 22, as shown, or molded and otherwise received within member 50, as desired, with the outer surface of the upstanding portion of the member 48 being adapted to receive a cable clamp thereover after a welding operation secures members 47 and 48 together.

Suitable access openings (not shown) may be provided in the cover 22, for the various cells, and with an easily removable and reclosable cap 51 being provided therefor.

It will be apparent that the casing 21 and the cover 22 are constructed generally of a hard rubber, or plastic material, preferably thermoplastic, for facility in forming the various configurations thereof, and with such material of construction being electrically non-conductive. It will also be apparent that the battery plates 43, thier lugs 44 or 45, and in instances wherein the straps 46 and posts 47 are utilized, as well as lugs 45, the same are of electrically conductive material, in accordance with conventional designs of comparable components of lead-acid storage batteries of prior art types.

After the outwardly protruding lugs 44 are placed through slots 39 of a casing 21, and the cover 22 is placed over the uppermost end of the casing 21, it will be apparent that the portion 30 of the cover 22, and most particularly its lowermost lip 52, defines, with an uppermost lip 53 of the casing, and with outer surfaces 54 of the uppermost slotted portions of sidewalls 23 and 24, a recess, that functions as a mold upon the application of sufficient heat to the outwardly protruding lugs 44, to melt the same, to effect a welding thereof, into weldments 55, as illustrated in FIGS. 2 and 4. If necessary, in some instances it may be desired to add additional weld metal, in order to fill the recess that is formed between lips 52 and 53.

It will also be apparent, that between adjacent cells such as those 35 and 36, that portion of the weldment 55 that connects plates 43A and 43B, for example in FIG. 4, provides a connection between plates of adjacent cells, with the weldment 55 also providing an electrical connection between selected plates of each of the cells 35 and 36 and the portion of the weldment 55 that connects the plates 43A and 43B.

Figure 5:
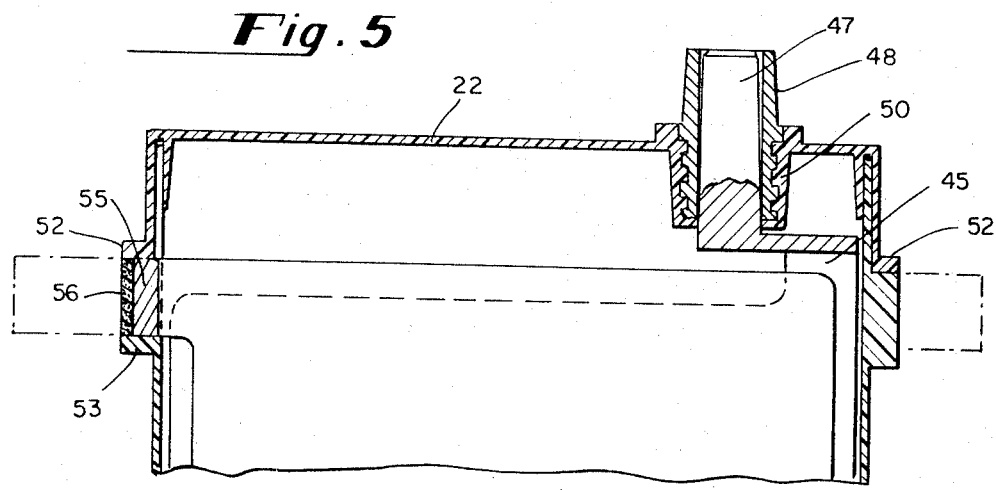
FIG. 5 is a transverse sectional view, taken generally along the line V—V of FIG. 4, and wherein the cover is also illustrated.

It will be apparent that the welding of the lugs 44 may be effected either by the application of open flame, or by the application of a heated element to the lugs 44, for melting the same sufficiently to create an integral fusion of selected ones of the lugs, with such melting also effecting a sealing of metal about the slots 30. In some instances, it may be desired to add additional weld metal, such as pot metal, lead or the like, to fill the recess between the lips 52 and 53, for example, as illustrated in FIG. 5.

Following the welding operation, an electrically non-conductive sealant 56 is provided to the weldments 55, there also extends between adjacent weldments 55, and provides an insualtor with respect thereto.

It will be further apparent that weldments such as those 55 between adjacent cells will be utilized, along the lines of that illustrated in FIG. 4, such that selected plates of adjacent cells 35 and 36 are connected, and, on the opposite side of the casing 21, selected plates of cells 34 and 35 are connected, and back along initial sidewall 23, selected plates of cells 33 and 34 are connected, etc. throughout the battery 20.

It will also be apparent that the coating 56 may be a resin or other material that is suitably non-conductive electrically, but which will adhere to the weldments 55, and also to the plastic, rubber or other materials of construction of the lips 52 and 53.

In FIGS. 6 and 7, there is illustrated an embodiment of the battery of this invention, generally designated by the numeral 60, and wherein terminals are provided along sidewalls of the battery, identified by the numeral 61. Otherwise, the construction of the embodiment of FIGS. 6 and 7 is identical to that of FIGS. 1-5, except that the terminals 61 are provided in weldments 62, similar to the weldment 55 of the embodiment of FIGS. 1-5, and wherein all of the battery plates 63 have lateral extension portions 64, that extend through slots 65 in battery sidewalls 66, thereby providing a battery having terminals along sidewalls thereof, or along the same sidewall, and not utilizing plates having upstanding lugs 45, but only plates having laterally extending lugs 64, like those 44 of the embodiment of FIGS. 1-5.

The lugs 64 are welded in the same manner as the embodiment of FIGS. 1-5, and the weldments 62 connecting lugs of plates of the same cell, and lugs of plates of adjacent cells (generally in pairs of two cells), also are integrally connected to terminals 61. The terminals 61 may be somewhat enlarged in cross-section, but are integrally connected to the weldments that connect lugs 64 of plates 63, with the terminals 61 also including an imbedded nut 67, having internal threads 68, for receiving a cap screw or the like therein, upon connection of electrical wires to the battery 60. The enlarged terminal 61 may be provided with a sealant 70, partially coating the same, and the mold for the weld material that forms the terminal 61 may comprise especially configured lips 71 and 72, as illustrated in FIGS. 6 and 7, if desired. The coating 70 may be integral with the coating for the weldment 62 connecting lugs 64, to provide a band of sorts around the battery 60, if desired.

In FIG. 8 there is provided another alternative battery construction 74, including a casing 75 and a cover 76, and wherein lugs 77 of battery plates 78 are connected together by weldments 80, outside sidewall portions 81 of the casing 75, with the lugs extending through slots (not illustrated), similar to the manner of the embodiment of FIGS. 1-5, but with the sidewall 75 having been especially heat formed, drawn, or otherwise configured preliminarily, to define a recess 82 for receiving and forming a female mold for the weldment 80, and also for forming a female mold for a resin 83, or like coating applied outside the weldment 80. Accordingly, if it is desired to have a flush external sidewall, or one substantially flush, an arrangement such as that illustrated in FIG. 8 may be utilized.

In constructing a battery of this invention, the same may be accomplished in accordance with steps illustrated in the various illustrations of FIG. 9. For example, a casing 21 may first receive plates 43 therein, with lugs 44 thereof protruding outwardly through slots 39, and with the casing cover 22 then being applied thereover, to form a construction such as that illustrated in FIG. 9B, which has also been rotated 90°, in order to be disposed on its side, on a suitable lower holding member 84, in which position a welding element 85, may be brought into contact with the lugs 44, in order to provide a heat for melting of the same, in order to fuse the lugs 44 together, during their solidification within a mold formed between lips 52 and 53, and outer surface portions 54 of uppermost end portions of sidewalls such as that of 23. A resin, plastic coating or the like 56 may then be applied in liquid form, from a nozzle 86, as illustrated in illustration 9D, to be solidified within the remaining portion of the recess formed between the external surface of the weldment 55 and lips 52 and 53.

Figure 10:
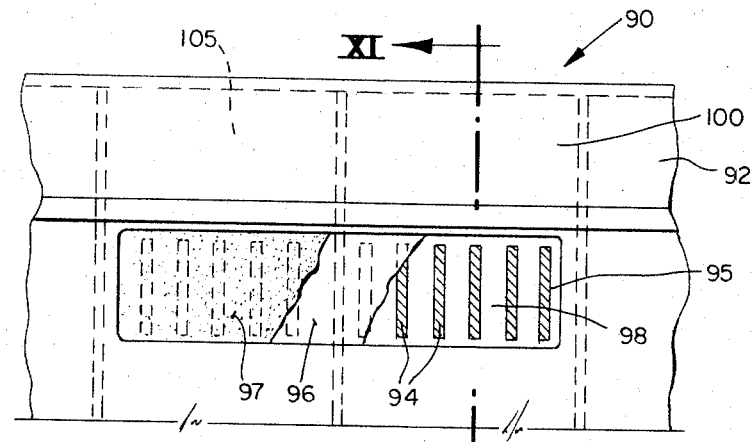
FIG. 10 is a fragmentary side elevational view of a portion of another modified form of a battery, in accordance with this invention.
Figure 11:
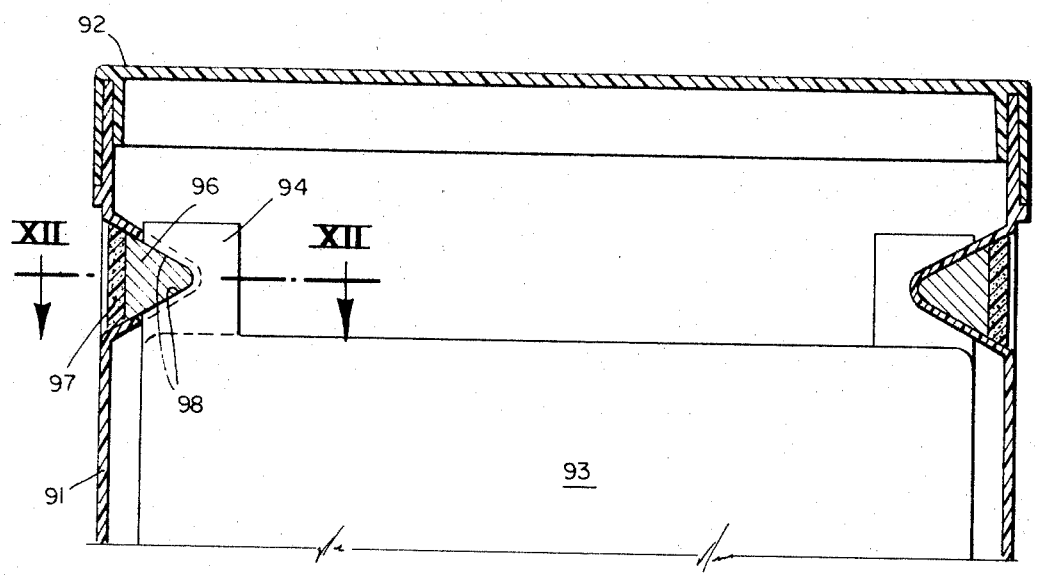
FIG. 11 is an enlarged transverse sectional view, taken generally along the line XI—XI of FIG. 10, and wherein an alternative battery plate weldment is illustrated.
Figure 12:
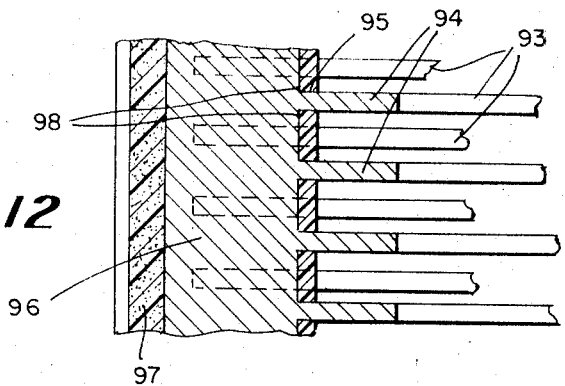
FIG. 12 is a further enlarged sectional view, of the weldment and plate lugs connected thereby, taken generally along the line XII—XII, of FIG. 11.

With reference to the illustration of FIGS. 10-12, another embodiment of a battery 90, in accordance with this invention is illustrated, as comprising a casing 91, having a cover 92 disposed thereover, in generally the same manner as that illustrated for the previously discussed embodiments of this invention, but wherein plates 93 of the various cells of the battery 90 have upstanding lugs 94, and wherein selected ones of the lugs 94 are connected together externally of the battery casing 91, along sidewalls thereof.

The battery 90 is otherwise constructed generally similar to the embodiments previously discussed, and may be provided with side terminals, or top terminals, in accordance with a preferred terminal construction. However, with respect to connecting together plates of batteries within the same cell, and/or connecting plates of batteries of adjacent cells, it will be noted that lugs 94 of plates 93, extend through slots 95 in casing sidewalls, and that such extending portions of the lugs 94 are connected by weldments 96, in the same manner as the weldments 55 connect lugs 44 of plates 43. Similarly, the weldments 96 are covered by a suitable insulating resin or the like 97, in much the same manner as that 56 of FIG. 2, for example. However, it will be noted that the portions 98 of the casing sidewalls are recessed inwardly, in a V-shaped notch arrangement, as is best illustrated in FIG. 11, for engaging sides of lugs 94 in the slots 95, tightly for sealing purposes, and with such portions of the lugs 94 as then protrude through the slots 95 being then integrally sealed by the weldment 96, prior to placement of a resin 97 thereover.

With reference to FIG. 10, it will thus be seen that plates 93 have lugs 94 thereof, of the same cell 100, connected by the weldment 96, as well as there being plates 94 of an adjacent cell 101 connected by the same weldment 96.

Figure 13:
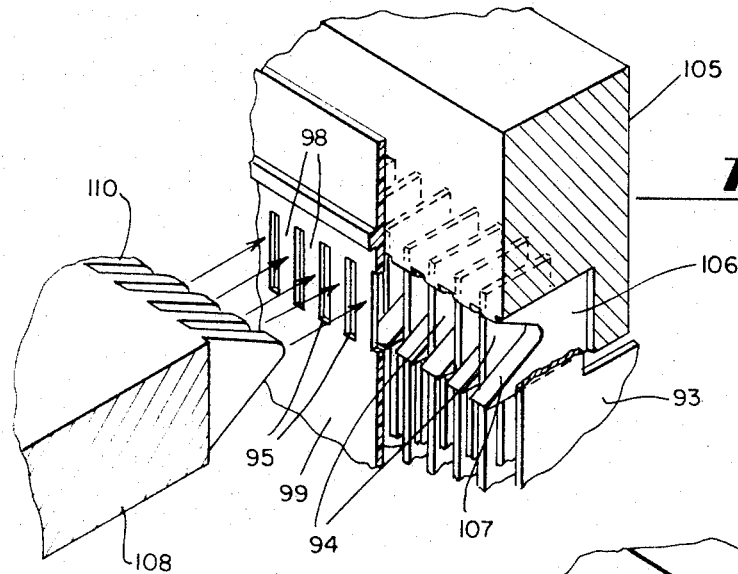
FIG. 13 is a fragmentary perspective view of one stage of formation of the battery construction illustrated in FIGS. 10-12.
Figure 14:
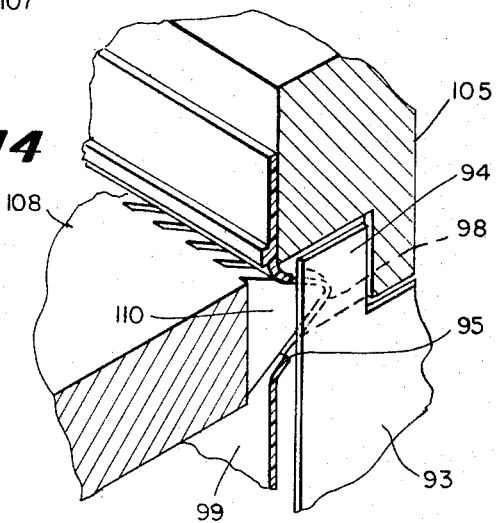
FIG. 14 is a view generally similar to that of FIG. 13, but wherein a subsequent stage of battery formation is illustrated, whereby a step of recessing of casing sidewall portions is illustrated.

The manner in which this is effected is that, after insertion of plates 93 (and generally non-conductive separators between the plates 93, not illustrated), into cells of a battery 90, a combination female die and holder arrangement 105 is inserted as illustrated in FIG. 13, to hold lugs 94 in position just behind slotted holes 95 of a generally vertically planar portion of a battery sidewall 99. Between plates 93, guide portions 106 of the female die 105, with V-notch cutouts 107 are provided, such that, upon bringing a generally heated male element 108, having spaced V-shaped protrusions 110 protruding therefrom,, into engagement with portions 98 of the sidewall 99 between slots 95 thereof, the application of lateral forces or pressure, generally also coupled with the application of heat by any suitable means to the member 108 will facilitate the inward moving or recessing of these sidewall portions 98, into the voids or recesses 107, whereby the sidewall portions 98 will assume the configurations therefor illustrated in FIG. 14.

Figure 15:
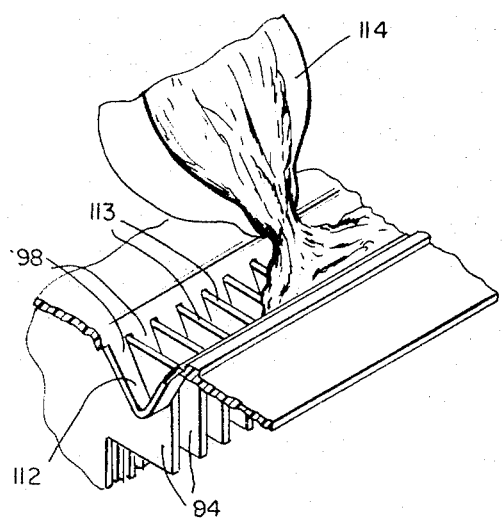
FIG. 15 is an enlarged fragmentary view of a further stage of battery construction, in accordance with the embodiment illustrated in FIGS. 10-12, and wherein the step of fusion of lugs protruding externally of the battery casing is illustrated.
Figure 16:
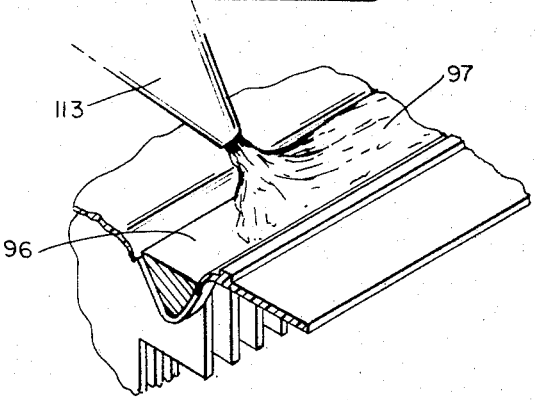
FIG. 16 is a fragmentary illustration of a subsequent stage of manufacture of a battery, from that illustrated in FIG. 15, wherein a sealant is applied over the weldment effected in the process step illustrated in FIG. 15.

Upon withdrawal of the member 108, the sidewall portions 98 serve to maintain the positioning of, and hold the positioning of the lugs 94. The casing of the battery is then rotated 90° whereby a channel 112 is filled with a liquid metal, such as lead, pot metal or the like for securing together those portions 113 of the lugs 94 that protrude through the voids 95. It will be noted, that in the alternative, those portions 113 of the lugs 94 may be welded together by application of open flame, or by the use of a solid heated element, if it is desired not to utilize a molten metal provided from a supply 114 therefor, as illustrated in FIG. 15.

Following the operation illustrated in FIG. 15, the weldment 96 is then provided with a coating 97, by a suitable supply 113 of the same, in liquid application form, although the same could be applied in solid forms subsequently heat-set over the weldment 96, for securement to opposite plastic sidewall portions of the casing. The member 105 may then be removed if such has not already been done.

It will be apparent that the battery casings will generally be pre-slotted, and such casings will be constructed of a thermoplastic material, for facilitating shaping of the same, to desired configurations, under the application of heat. It will be further noted that the coating or sealant applied over weldments may be resin, epoxy, or the like. For example, in some instances polypropylene plastic may be utilized as a case material, notwithstanding some difficulty of utilizing ordinary sealants with the same. It will also be apparent that recessing of the external connections between plates, as illustrated in the embodiments of FIGS. 8 and 11 may be highly desirable, in order to protect the weldments that comprise such connections, although the same may not be essential.

It will be apparent herein, that the term "battery" is intended to include a structure not yet having an acid or other liquid electrolyte disposed within cells thereof.

It will also be apparent that various modifications may be made in the details of construction, as well as in the use and operation, and also as well as in the method of manufacture of batteries, in accordance with this invention, all within the spirit and scope of the appended claims. For example, in some instances, it may be desirable to have the battery main terminals at the upper end of the battery, outside the cover thereof. In other instances, it will be desirable to have such terminals along one or more sidewalls of the battery, and that the present techniques facilitate all such arrangements as are desired.

What is claimed is:

1. A battery of the multiple cell type, comprising a casing having partition plates separating adjacent cells, a plurality of battery plates disposed in each cell, and means for connecting battery cell plates of adjacent cells, said connecting means being located externally of said casing, wherein said plates are carried in cells in generally parallel relation to each other, substantially extending between opposite sidewalls of said casing, and wherein the locations of said connecting means are along sidewalls of said casing, including means associated with each said cell for connecting together selected plates of said cell, said latter connecting means being located externally of said casing, wherein said plates are provided with lateral extension portions that extend through sidewall portions of said casing, with elongated laterally opening recess means being provided as part of said casing sidewall portions, along each side of said casing, said recess means being defined in part by vertically spaced recess limits that comprise portions of said casing, wherein said recess means comprise laterally, generally oppositely directed molds for welding, and with said connecting means comprising common weldment means for connecting at least some plates in a given cell and plates of adjacent cells in each said recess means.

2. The battery of claim 1, wherein vertical slots are provided in casing sidewalls at upper ends thereof for receiving said lateral extension portions of plates therethrough.

3. The battery of claim 2, wherein one said slot is provided for each said plate having a lateral extension.

4. The battery of claim 1, including battery terminal means provided along said battery sidewalls, in integral connection with a said common weldment means.

5. The battery of claim 2, wherein alternate plates within each said cell have their lateral extension portions protruding through associated said slots in alternate sidewalls of said casing, and with a said common weldment being provided on each sidewall of said battery in welded connection with all plate lateral extensions that extend through a corresponding said battery sidewall from a pair of adjacent cells that have plates thereof connected.

6. The battery of claim 5, including means providing an electrically insulating coating for said weldments.

7. A battery of the multiple cell type, comprising a casing having partition plates separating adjacent cells, a plurality of battery plates disposed in each cell, and means for connecting battery cell plates of adjacent cells, said connecting means being located externally of said casing, wherein said plates are carried in cells in generally parallel relation to each other, substantially extending between opposite sidewalls of said casing, and wherein the locations of said connecting means are along sidewalls of said casing, wherein said plates are provided with extension lugs having portions that are disposed through portions of the sidewall of said casing, and with said connection means comprising weldment means that connect said lugs portions of plates of adjacent cells, wherein said weldment means also connects together selected lugs of plates of the same cell, wherein said lugs of plates are upstanding, and wherein said sidewall portions of said casing have protrusions extending inwardly of said battery and with said portions that are disposed through sidewall portions of the casing being disposed through said protrusions thereof.

8. The battery of claim 7, wherein the protrusions are vertically slotted, and with said lugs being in receiving engagement within said slots, with associated said lug portions protruding through said slots.

9. The battery of claim 8, including an electrically non-conductive coating being provided over said weldment means externally thereof.

10. The battery of claim 9, wherein none of said weldment means and coating therefor protrude externally of a general plane of said casing sidewalls.

11. A method of making multiple cell batteries comprising the steps of providing battery casings with voids in sidewalls thereof, providing plates for the battery cells, with the plates having lateral extensions thereof, inserting the plates into the battery cells with the lateral extensions thereof passing through battery casing sidewalls, welding selected ones of the lateral extensions together externally of the casing sidewalls while the casing is disposed with the sidewall in which the lateral extensions are being welded facing generally vertically upwardly to provide an electrically conductive connection between selected plates of a given cell and between selected plates of a pair of adjacent cells, and covering the weldments thus effected with an electrically insulating material.

12. A method of making multiple cell batteries comprising the steps of providing battery casings with voids in sidewalls thereof, providing plates for the battery cells, with the plates having lug extensions, inserting the plates into the battery cells with lugs of the plates being held in lateral alignment with the voids of the casing sidewalls, engaging portions of the sidewalls adjacent to the voids and recessing such portions inwardly of casing sidewalls between adjacent lugs of the plates of the same cell and of an adjacent cell at at least one location along each of the opposed sidewalls of the casing, such that lug portions protrude through the inwardly recessed voids, and fusing protruding portions of the lugs together along the recess thus formed for electrical conductivity between fused lugs.

13. The method of claim 12, wherein said recessing step comprises the application of heat and lateral force to deform sidewall portions inwardly.

14. The method of claim 12, including the step of coating the electrically conductive fusion thus formed with an electrically non-conductive substance.

* * * * *